United States Patent Office 3,403,980
Patented Oct. 1, 1968

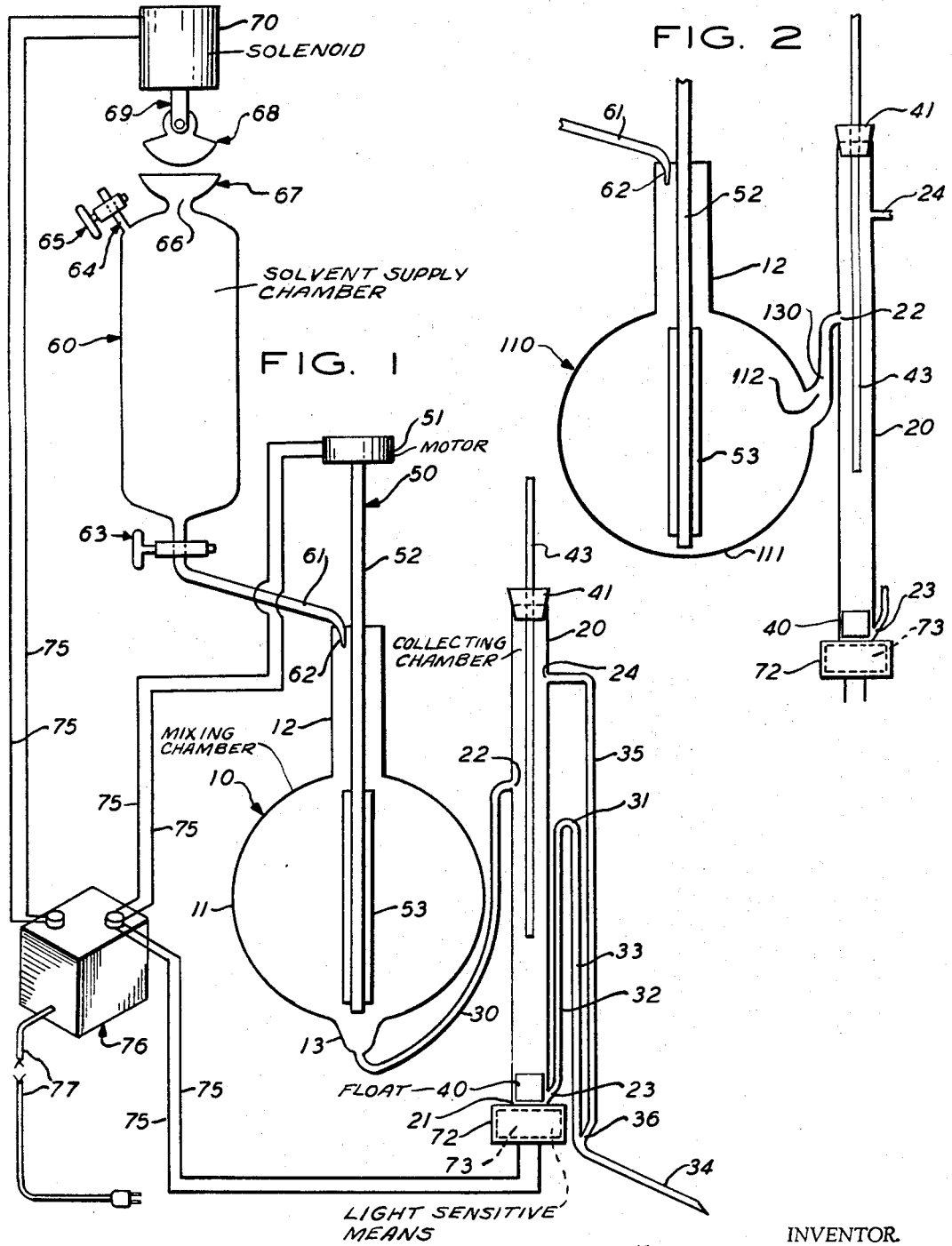

3,403,980
AUTOMATIC REPETITIVE LIQUID-LIQUID
EXTRACTOR
Frank R. Litterio, 53 S. Maple Ave.,
East Orange, N.J. 07018
Filed Dec. 7, 1964, Ser. No. 416,408
4 Claims. (Cl. 23—267)

ABSTRACT OF THE DISCLOSURE

An automatic repetitive liquid-liquid extractor employing a solvent supply chamber, a mixing chamber and an extract collecting chamber with means to periodically discharge extract therefrom, and means to control mixing in the mixing chamber and solvent flow from the solvent supply chamber to the mixing chamber responsive to the liquid level in the collecting chamber. The liquid level in the collecting chamber has associated light sensing means to control the operation. Discharge from the collecting chamber is through a siphon having connected thereto a gas vent.

---

This invention relates to novel methods and apparatus for separating one or a combination of two or more components from a mixture of components. In one of its more specific aspects the invention is directed to novel methods and apparatus for effectively separating at least one component from a mixture of components by the use of two substantially immiscible liquid media.

The methods and apparatus of the present invention are especially useful in laboratories for assaying the active ingredient in products in which said ingredient is present and are also useful both in the laboratory and in commercial practice for purifying, separating and/or concentrating one or more ingredients in a product in which they are components.

In one of its specific aspects the methods of the present invention are unique due to their great efficiency. By employing the novel apparatus of the present invention, effective automatic liquid-liquid separation of one component from a mixture of components in a product may be achieved automatically with the use of two different liquid media, which are substantially completely immiscible and one of which is heavier than the other. By employing the apparatus and the preferred methods of this invention the product containing a plurality of components is dissolved in a normally liquid solvent. This solution is charged into a vessel and from a source of normally liquid selective solvent supply there is automatically added thereto a predetermined quantity of said selective solvent at a predetermined rate. The selective solvent is capable of dissolving at least one but not all of the components in said solution and is immiscible with the first mentioned solvent and has a density characteristic different from that of said first mentioned solvent. The liquids are automatically agitated in the course of addition of the selective solvent and the period of agitation and said addition is preferably in the time range of about 1 to about 2 minutes when practiced in the laboratory for assaying and the like, one of the main and important applications of this invention. At the end of said period agitation of said liquids is automatically terminated and substantially simultaneously therewith, the rate of flow of said selective solvent to said liquids is reduced to a value of about 0.01 to about 0.1 times said first mentioned rate, whereby the immiscible liquids separate but the addition of selective solvent continues. After a predetermined quantity of said selective solvent has been added at said slower rate, a predetermined quantity of only the solution of said selective solvent containing the separated component is automatically siphoned off and collected; and then after the cessation of said siphoning action said steps are automatically repeated at least once, that is one or more times.

By practice the novel methods of this invention, many more assays may be conducted by a single technician in a work day than is possible when the common separatory funnels are used.

The novel apparatus employed for practicing the novel methods of this invention is relatively simple and inexpensive. In addition it may be set up rapidly by the ordinary laboratory technician, and in laboratory use a plurality of them may be set up on a single bench and require very little if any attention after they are set up and started for their intended use.

Illustrative examples, given by way of illustration and not limitation are the apparatus shown in the appended drawings, wherein:

FIG. 1 is a diagrammatic view of an embodiment of the apparatus of this invention for use with a selective solvent of greater density than the original solvent.

FIG. 2 is a modification of a part of the apparatus of FIG. 1 and to be substituted for that part in FIG. 1 to provide apparatus for use with a selective solvent of lesser density than that of the original solvent.

In the embodiment shown in FIG. 1, the apparatus comprises a mixing chamber 10 in the form of a flask consisting of a spherical body portion 11 in communication with and terminating in an elongated neck 12. The bottom of the flask 10 terminates in an open ended shallow well 13 in communication with the body portion 11 thereof at the lower end thereof. Located to one side of the flask 10, which is vertically disposed, with the neck 11 being uppermost is a vertically disposed light transparent glass collecting chamber or cylinder 20 having a light transparent glass bottom closure 21 integral therewith. The cylinder 20 has a plurality of small apertures or openings 22, 23 and 24 therein. Opening 22 is disposed directly opposite approximately the upper extremity of the body 11 of chamber 10. One end of a narrow glass tube 30 is integral with or otherwise secured to the cylinder 20 at the opening 22 and its other end is integral with or otherwise secured to the lower open end of well 13 for conducting liquid from the well 13 into the collecting chamber 20. The opening 23 is at the lower extremity of cylinder 20 and the opening 24 is located an appreciable distance vertically upwardly beyond the opening 22. An inverted approximately U-shaped narrow tube 31 having legs 32 and 33 is disposed vertically. The lower end of leg 32 is integral with or otherwise connected to cylinder 20 at the opening 23 therein. The lower end of leg 33 is integral with or otherwise connected to a short narrow delivery tube 34. One end of a narrow tube 35 is integral with or otherwise connected to cylinder 20 at opening 24 therein and its other end is integral with or otherwise connected to leg 33 or the delivery tube portion 34 thereof at an opening 36 therein which is located preferably no higher than opening 23.

Located in the cylinder 20 and resting on closure 21 is an opaque float 40 which may be a sealed hollow element composed of glass, "Teflon" or other inert material. A glass or "Teflon" closure plug 41 having a vertically disclosed central opening therethrough is located in the upper end of cylinder 20. A narrow vertically disposed narrow glass tube 43 extends through said opening in said plug 41. The tube carrying plug 41 seals the upper end of the cylinder 20 and the tube 43 which forms a seal with plug 41 is adjustable vertically. The foregoing arrangement of parts may be supported in any convenient manner as for example by one or more supporting stands (not shown) whose clamping elements (not shown) clamp the neck 12 and cylinder 20 to hold them in their vertical positions shown.

Supported by a stand (not shown) is a stirring device 50 comprising an electric motor 51, a vertically disposed drive shaft, 52 and a stirrer 53. The stirrer 53 is disposed in the sphere 11 and the drive shaft 52 extends through neck 12 to motor 51.

A vertically disposed dropping or extractor solvent supply chamber or funnel 60 is located above flask 10 and is supported by a stand (not shown) or other supporting device. The funnel 60 has an outlet tube 61 with a constricted tip 62 which is disposed in the upper end of neck 12. The tube 61 carries an adjustable stop-cock 63. A short tube 64 carrying an adjustable stop-cock 65, is integral with funnel 60 at the upper end of one side thereof. The center of the upper end of funnel 60 terminates in a large inlet 66 in communication with the saddle 67 of a ball joint sealer. The ball part 68 of said sealer is pivotally connected to the armature 69 of a solenoid 70 supported by any convenient means.

Located below the light transparent closure 21 is a housing 72 carrying a light sensitive device 73. The housing 72 may be in the form of a skirt integral with and depending from the bottom of collecting chamber 20. The device 73, motor 51 and the winding of solenoid 70 are all connected by electrical conductors 75 to electrical means 76 in turn connected by electrical conductors 77 a source of E.M.F. to control the energization of the solenoid 70 and motor 51 depending upon whether or not device 73 is subjected to light.

The embodiment shown in FIG. 1 is employed in those instances where the heavier phase is to be collected. However when the lighter liquid is to be collected the embodiment shown in FIG. 1 is modified in the manner of FIG. 2. In that embodiment the flask 110 is substituted for flask 10 of FIG. 1. The flask 110 has a fairly large opening 112 in the mid-side of the spherical portion 111 thereof. The lower extremity of opening 112 is at approximately the mid-height of the spherical portion 111 thereof. The flask 110 is in communication with the cylinder 20 by a glass tube 130 of gradually decreasing diameter. One end of tube 130 is integral with or otherwise connected to flask 110 and its other end is integral with or otherwise connected to opening 22 in cylinder 20. And, as in the embodiment shown in FIG. 1, the opening 22 is directly opposite or in approximately the same horizontal plane as the lower end of neck 12 or upper end of spherical portion 111. Otherwise, the embodiment shown in FIG. 2 is the same as the entire embodiment shown in FIG. 1.

Employing the embodiment shown in FIG. 1, the method of operation to separate and recover a chloroform soluble component from a hypothetical water-soluble mix containing said chloroform soluble component and a chloroform insoluble component is as follows:

The selective solvent chloroform is charged through neck 12 into the flask 10 in such amount that the well 13 and the lower part of tube 30 are filled. With the stop-cock 63 in closed position, the funnel 60 is filled with chloroform through inlet 66. The sealer 68 is released and drops into sealing position on saddle 67.

The flask 10 is now charged through inlet 12 with an aqueous solution of the mix to be treated or assayed. The volume of said aqueous solution is less than the volume of the spherical portion 11, but is about 50–80% of the volume of said spherical portion 11 depending upon the partitioning coefficient of the chloroform soluble component between chloroform and water. Stop-cock 63 is now fully opened and stop-cock 65 is now only slightly opened so that drop-wire feeding of the chloroform into flask 10 is achieved as later required, or may be permitted to remain fully closed and later so adjusted. The electrical means 76 is then immediately operatively connected to a source of E.M.F. whereby the coil of solenoid 70 is energized whereupon the armature 69 is elevated to raise ball sealer 68 to inoperative position out of saddle 67; and simultaneously motor 51 becomes energized to drive the stirrer 53. As a consequence thereof, the chloroform flows freely at a relatively rapid rate from chamber 60 through tip 62 into the flask 10 and is being mixed therein by stirrer 53 with the aqueous solution therein. A predetermined quantity of the selective solvent used in this example, chloroform is added at said rapid rate and in general is sufficient to fill all the originally unoccupied space above the aqueous solution in body 11 so that the upper surface of the mix reaches at least the lower extremity of the neck 12, and depending upon the density of the selective solvent used, may be above said extremity but below the upper extremity of neck 12. Because the tip 62 is of reduced diameter, the rapid rate of flow of the predetermined quantity of the selective solvent, chloroform, at this stage is such that at least 1 minute is required for said addition and is achieved in a period preferably no greater than 2 minutes during which agitation is continuously maintained. In the course of this addition and agitation, the solute in chloroform continuously separates from the aqueous phase of the mixture as it enters the well and ultimately rises in tube 30 to the level of the mixture in the flask. This water-free solute in chloroform rises in tube 30, then passes into cylinder 20. Immediately after only a small amount of said solution enters cylinder 20, the float 40 rises a slight degree whereupon light passes through chamber 20 and the solution therein and affects the light sensitive means 73. The means 76 acting in response to the affected light sensitive means 73 deenergizes both the motor 51 and solenoid 70 to stop the stirrer 53 and to release the armature 69 whereby element 68 drops into the saddle 67 and sealing is effected at the saddle 67. At this stage, the mass in flask 10 is no longer being stirred and commences to separate into two layers, with the aqueous layer on top, but the flow of chloroform from funnel 60 into flask 10 is not stopped completely, which would otherwise occur, if the cock 65 were in fully closed position. However, the cock 65 is in only such partially closed position that the flow of chloroform into flask 10 continues and its rate is considerably less than when the ball seal was "broken." The cock 65 is in such adjusted position, either previously or now made that the rate of flow of chloroform is now in the range of about 0.01 to about 0.1 of its rapid rate of flow when said ball seal was "broken" as heretofore described. Chloroform continues to flow in flask 10 at said reduced rate and in this step while the stirrer is in inoperative condition, the mix in the flask continues to separate into two layers, the lower layer being water-free solution of solute in chloroform. The water free solution continues to flow through tube 30 into the cylinder 20 and tube 31 due to the continuous addition of the chloroform at reduced rate into flask 10. This action continues until the solution from cylinder 20 reaches the upper limit of the bend in the inverted U tube 31 due to the head-pressure exerted by the liquid mass in the flask 10 whose level is now well up in the neck 12 thereof. Just prior to this stage, the tube 43 is adjusted in plug 41 so that its lower extremity is in the same horizontal plane as the interface between the upper and lower layers formed in flask 10. A short time after this adjustment is made the solution in tube 31 due to said head pressure exerted thereon flows over the bend whereupon siphoning is automatically initiated and the solution in the flask 10 below the plane of the lower limit of tube 43 is automatically siphoned off through tube 31 and its delivery tube 34 into a collecting receiver not shown. The tube 43 serves to permit air to be expelled from cylinder 20 up until the level of the solution in cylinder 20 reaches the lower limit of tube 43 and thereafter the tube 35 permits the air to be expelled from cylinder 20 as the solution rises in tube 43 and cylinder 20 in the course of reaching its upper level therein before siphoning occurs through tube 31. As siphoning occurs in tube 31 through its terminal delivery tube, the lower end of tube 35 is sealed by the traveling solution whereby siphoning is continued until tube 43 is emptied and this siphoning would not otherwise occur if the lower end of tube 35 were not sealed at this stage. In this siphoning step the level of the solution in chamber 20 remains at approximately the level of opening 22, but its level in the tube 43 drops at the same rate as the level of the mass in flask 10 for the reason that both flask 10 and tube 43 are open to the atmosphere. However when tube 43 is empty, air is automatically admitted therethrough into the solution in tube 20 and bubbles therethrough causing termination of suction from flask 10 so that no more liquid is removed from flask 10. However, siphoning continues through tube 31 whereby substantially all of the remaining solution in cylinder 20 is removed and delivered to the receiver, and at this stage the float 21 automatically returns to its original position thereby cutting off the light to the light sensitive element 73 whereupon means 76 acting in response thereto causes energization of solenoid 70 and motor 51 and the aforesaid procedure is repeated. This procedure is repeated again and again depending upon the number of extractions desired. The amount of solvent originally in 60 is sufficient to satisfy the number of extractions which may be 1–10 or more, there being no upper limit.

The mode of operation of the device as modified in FIG. 2 is essentially the same as that heretofore described with respect to FIG. 1. In this instance however, the extractive selective solvent used is lighter in weight or of lesser density than the solvent for the mixture. Consequently the solution of the mixture is charged into flask 110 and is of such volume that its upper level is located vertically upwardly beyond the lower limit but a little below the upper limit of opening 112. The operation is the same as hereinbefore described except that the upper layer rather than the lower layer is drawn off and collected.

Since certain changes in carrying out the aforementioned methods and in the constructions set forth, which embody the invention, may be made without departing from its scope, it is intended that all matter contained in the description or shown in the accompanying drawings shall be interpreted as illustrative and not in a limiting sense.

I claim:
1. An automatically repetitive liquid-liquid automatic extractor comprising:
   a mixing chamber having an inlet first opening at the top thereof and an outlet second opening therein, said second opening spaced a material distance vertically below said inlet opening,
   a collecting chamber disposed beside said mixing chamber and having a liquid outlet third opening in the lower end thereof, a liquid inlet fourth opening therein spaced a material distance vertically above said second and third openings, and an air outlet fifth opening disposed at a level materially above said fourth opening,
   first means extending between said second opening and said fourth opening for conducting liquid from said mixing chamber into said collecting chamber,
   siphon second means for conducting liquid from said third opening into a receiver, with a first portion thereof extending upwardly a considerable distance vertically beyond to a level above said third opening and a second portion thereof extending downwardly from the upper end of said first portion and with the apex of said means being below said fourth opening for automatically siphoning liquid from said collector chamber when the level of said liquid collected therein reaches a predetermined level,
   third means for conducting air from said air outlet opening into the lower part of said second portion,
   an open ended tube extending through the top of said collecting chamber and having an opening to the atmosphere and an opening to the interior of said collecting chamber for the passage of air therethrough and into and out of said collecting chamber, the lower end of said tube being located below said fourth opening,
   fourth means for sealing the top of said collecting chamber disposed between the interior surface of said collecting chamber and the outer surface of said open ended tube,
   fifth means for supplying an extractor solvent at a predetermined rate through said first opening into said mixing chamber, said fifth means including an extractor solvent supply chamber and means for conducting extractor solvent at a predetermined rate from said supply chamber into said mixing chamber through the inlet first opening thereof,
   actuable sixth means for agitating liquids in said mixing chamber,
   a float in said collecting chamber, said float being automatically movable vertically in response to variations in the level of liquid in said collecting chamber, and
   seventh means automatically operable in response to said float reaching at least a predetermined position in the course of its upward movement to reduce said rate of flow of the extractor solvent into said mixing chamber and to terminate actuation of said sixth means to cease agitation of the liquid in the mixing chamber, said seventh means being automatically operable in response to said float reaching at least a predetermined position in the course of its downward movement to control said fifth means to reestablish the flow of the extractor solvent at said predetermined rate into said mixing chamber and to cause actuation of said sixth means to reestablish agitation in said mixing chamber.

2. An automatically repetitive liquid-liquid extractor according to claim 1,
   said mixing chamber terminating in an upwardly extending neck, the lower terminus of said neck being located at approximately the same level as said fourth opening.

3. An automatically repetitive liquid-liquid extractor according to claim 1,
   said first means including a shallow well secured to said mixing chamber at said second opening, being in communication with said mixing chamber and depending therefrom.

4. An automatically repetitive automatic liquid-liquid extractor comprising:
   a mixing chamber terminating at its top in a vertically upwardly extending neck and having at its bottom a shallow, downwardly extending well, an outlet first opening in the bottom of said well, said opening being located a material distance below the lower limit of said chamber,
   a vertically disposed elongated collecting chamber disposed beside said mixing chamber and having a liquid outlet second opening in the lower end thereof, a liquid inlet third opening therein spaced a material distance vertically upwardly beyond said first and second openings and located at approximately the same height as the lower end of said neck, and an air outlet fourth opening spaced a material distance vertically upwardly beyond said second opening,
   means extending between said first opening and said third opening for conducting liquid from said well into and through said third opening to said collecting chamber,
   a vertically disposed inverted approximately U-shaped conduit for conducting liquid from said second opening into a receiver, said conduit extending upwardly from said second opening and then downwardly, with the apex of said conduit being below said third opening for automatically siphoning liquid from said collector chamber when the level of said liquid collected therein reaches a predetermined level,
   means connecting the upper portion of said collecting chamber with the lower portion of said U-shaped conduit for conducting air from said fourth opening into the lower portion of said conduit, a vertically disposed open ended tube for the passage of air therethrough, with the lower end thereof disposed below said third opening, means for sealing the upper part of said collecting chamber disposed between the interior surface of said collecting chamber and the outer surface of said tube, an extractor solvent supply chamber, at least a part of said chamber disposed at a level above said mixing chamber and having a sealable solvent inlet fifth opening in the upper part thereof, a valved air-inlet in the upper part of said supply chamber and first actuable means for sealing and unsealing said fifth opening, means for conducting extractor solvent at a predetermined rate from the lower part of said supply chamber into said mixing chamber through said neck, second actuable means for agitating liquids in said mixing chamber, an opaque float in said collecting chamber, said float being automatically movable vertically in response to variations in the level of liquid in said collecting chamber, light sensitive means disposed outside of said collecting chamber and near the lower end thereof, means automatically operable in response to an electrical characteristic of said light sensitive means due to light reaching same when said float reaches a predetermined position in its upward movement to reduce the rate of flow of the extractor solvent from said source and to terminate actuation of said second actuable means for agitating said liquids, said automatic responsive means being automatically operable in response to a change in said electrical characteristic of said light sensitive means due to light being prevented by said float from reaching same when said float reaches a predetermined position in its downward movement to actuate said first actuable means and reestablish the flow of the extractor solvent at said predetermined rate from said source of supply and to cause actuation of said second actuable means for agitating said liquids.

References Cited
UNITED STATES PATENTS

| | | | |
|---|---|---|---|
| 413,616 | 10/1889 | Domeier | 23—309 |
| 1,942,848 | 1/1934 | Taylor | 23—272.6 X |
| 2,543,522 | 2/1951 | Cohen | 137—78 |
| 2,660,518 | 11/1953 | White | 23—272.6 X |
| 2,692,820 | 10/1954 | Alway | 23—309 |
| 2,994,594 | 8/1961 | Haines | 23—259 X |
| 3,124,148 | 3/1964 | Kleiss | 137—93 |
| 3,189,533 | 6/1965 | Anscherlik | 137—93 X |
| 3,291,703 | 12/1966 | Dvonch | 202—181 |

OTHER REFERENCES

Royner: The Chemical Age, Sept. 11, 1943, page 267.

NORMAN YUDKOFF, *Primary Examiner.*

S. J. EMERY, *Assistant Examiner.*